United States Patent
Reis et al.

[11] Patent Number: 5,975,183
[45] Date of Patent: Nov. 2, 1999

[54] REPAIR PRESSURE APPLICATOR FOR IN THE FIELD DAMAGED AIRCRAFT

[75] Inventors: Carl A. Reis, Torrance; Nicholas Thomas Castellucci, Lomita; John C. Del Ferraro, Whittier, all of Calif.

[73] Assignee: Northrop Grumman Corporation, Los Angeles, Calif.

[21] Appl. No.: 09/046,484

[22] Filed: Mar. 23, 1998

[51] Int. Cl.[6] .............................. B29C 73/32; B30B 5/02
[52] U.S. Cl. .......................... 156/580; 100/211; 156/94; 269/21; 269/22; 425/11
[58] Field of Search .................... 156/580, 94; 100/211; 425/11, 12; 269/21, 22

[56] References Cited

U.S. PATENT DOCUMENTS

| | | | |
|---|---|---|---|
| 3,207,503 | 9/1965 | Clover, Jr. et al. | 269/21 |
| 3,661,683 | 5/1972 | Engel et al. | 156/580 |
| 3,770,259 | 11/1973 | Wagreich | 269/21 |
| 3,833,230 | 9/1974 | Noll | 279/3 |
| 3,837,965 | 9/1974 | Mahon | 156/94 |
| 3,910,620 | 10/1975 | Sperry | 294/64 |
| 5,047,668 | 9/1991 | Bosenberg . | |
| 5,374,388 | 12/1994 | Frailey | 264/510 |
| 5,400,173 | 3/1995 | Komine . | |
| 5,442,156 | 8/1995 | Westerman et al. | 219/243 |
| 5,492,466 | 2/1996 | Frailey | 425/389 |
| 5,728,258 | 3/1998 | Chung | 156/580 |

FOREIGN PATENT DOCUMENTS 2252840  8/1992  United Kingdom .

*Primary Examiner*—Daniel Stemmer
*Attorney, Agent, or Firm*—Terry J. Anderson; Karl J. Hoch, Jr.

[57] ABSTRACT

A pressure applicator device for applying pressure to a repair patch of a variable contoured aircraft surface, the pressure applicator device is provided with an inflatable pressure bladder. The bladder is configured for applying pressure to the repair patch and is formed of a generally fluid tight elastic material. The pressure applicator device is further provided with at least one variable direction adjustable arm. The arm is disposed in mechanical communication with the bladder for facilitating the application of pressure by the bladder to the repair patch upon inflation of the bladder. The bladder is further provided with at least one suction device for providing suction attachment to the aircraft surface. The bladder is attachable to a respective one of the at least one variable direction adjustable arm. The arm facilitates selective attachment of the respective suction device to the variable contoured aircraft surface while maintaining the position of the bladder with respect to the repair patch.

23 Claims, 2 Drawing Sheets under pressure is limited by the amount of vacuum pressure which may be achieved. For
REPAIR PRESSURE APPLICATOR FOR IN THE FIELD DAMAGED AIRCRAFT

FIELD OF THE INVENTION

The present invention relates generally to aircraft repair pressure applicators, and more particularly to a repair pressure applicator having an inflatable bladder for applying pressure against a repair patch for on-aircraft repairs.

BACKGROUND OF THE INVENTION

Typically the on-aircraft surface repair process includes filling a damaged surface region with an adhesive or other filler material so as to bring the surface of the damaged area flush with that of the adjacent undamaged surface areas. A repair patch is formed to substantially conform to the contour. The repair patch formed so as to overlap onto the adjacent undamaged surface area to obtain a metal-to metal (or composite-to-composite, as the case may be) bond region adequate to hold the repair patch in place. The repair patch is then adhesively bonded to the damaged area with a curing adhesive. The term adhesive is contemplated to include, but not limited to, epoxy resin, glue, cement and other bonding agents. Commonly, the adhesive requires heat to be applied to properly cure the adhesive or to accelerate the curing process.

In addition, trapped air is commonly encountered in the bondline between the structure and the repair patch and may take the form of small bubbles and volatiles where produce porosity in the bondline. During the curing process, however, these small bubbles may grow to become large bubbles or voids which significantly reduce the quality of the adhesive bond. It is known in the art that the application of uniform pressure to the repair patch during the curing process tends to squeeze out the trapped air in the bondline or otherwise mitigate the growth of the air bubbles into larger ones. Thus, the quality of adhesive bonding depends largely upon the application of substantially uniform pressure over the repair patch during the adhesive curing process.

A conventional method of applying pressure to the repair patch for on-aircraft repair involves using a flexible vacuum bag or cover. The vacuum bag is positioned over the repair patch and sealed around the perimeter. A vacuum or negative pressure source is applied to the vacuum bag so as to evacuate the vacuum bag, thereby collapsing the vacuum bag and forcing the vacuum bag against the repair patch. The amount of pressure applied to the repair patch is limited by the amount of vacuum pressure which may be achieved. For example, where there are holes or otherwise porous surfaces within the vacuum bagged area, such holes must be sealed prior to achieving adequate vacuum pressure. In addition, the sealing of the perimeter of the vacuum bag may present problems, especially where significant vacuum pressures are required to achieve a corresponding desired repair patch pressure.

Another method of applying pressure to an on-aircraft repair patch involves using tooling constructed specifically for a given repair. Obviously, such repair specific tooling is costly, labor intensive and inefficient.

Where the adhesive is a heat-curing adhesive, a heat source is additionally applied to the repair patch in conjunction with a pressure applicator. A conventional method for applying heat is through the use of a heating blanket.

Furthermore, aircraft surfaces in need of repair often are not located on smooth, flat, upward-facing areas. As such, repairs typically need to be effectuated surfaces which may be vertical or even downward facing. In addition, where the repair surface is located at an area of the aircraft which is contoured, the repair patch may be oriented significantly different from those surfaces immediately adjacent to the repair patch. For example, the convex curvature at the leading edge of the aircraft wings and the concave curvature where the wings intersect the aircraft fuselage present potential repair areas where the aircraft surface at the repair patch is significantly different from adjacent surface areas. Conventional pressure applicator devices may not be readily deployable at such contoured regions.

It is therefore evident that there exists a need in the art for a pressure applicator device for applying pressure to a repair patch during the curing process which facilitates on-aircraft repairs, applies substantially uniform pressure to the repair patch, accommodates the use of a heat source, such as a heating blanket, and is deployable adjacent a variable contoured aircraft surface.

SUMMARY OF THE INVENTION

In accordance with the present invention, a pressure applicator device for applying pressure to a repair patch of a variable contoured aircraft surface, the pressure applicator device is provided with an inflatable pressure bladder. The bladder is configured for applying pressure to the repair patch and is formed of a generally fluid tight elastic material. The pressure applicator device is further provided with at least one variable direction adjustable arm. The arm is disposed in mechanical communication with the bladder for facilitating the application of pressure by the bladder to the repair patch upon inflation of the bladder. The bladder is further provided with at least one suction device for providing suction attachment to the aircraft surface. The bladder is attachable to a respective one of the at least one variable direction adjustable arm. The arm facilitates selective attachment of the respective suction device to the variable contoured aircraft surface while maintaining the position of the bladder with respect to the repair patch.

The aircraft surface at the repair patch may be oriented significantly different from those surfaces immediately adjacent to the repair patch. For example, the convex curvature at the leading edge of the aircraft wings and the concave curvature where the wings intersect the aircraft fuselage present potential repair areas where the aircraft surface at the repair patch is significantly different from adjacent surface areas. The variable direction adjustable arm facilities the deployment of the pressure applicator device of the present invention at such contoured aircraft surfaces. The arm allows for the selective attachment of the accompanying suction device at a location on the aircraft surface where desired because of its variable direction and adjustable nature. Furthermore, where the aircraft surface contains surface irregularities, which may tend to inhibit secure attachment of the suction device to such a surface, the variable direction adjustable arm further facilitates selective attachment of the suction device to avoid such irregularity containing surface regions.

In one embodiment of the pressure applicator device of the present invention, the variable direction adjustable arm is provided with an upper elongate member. The upper elongate member is provided with a first connection point and second connection point. The first connection point is disposed in mechanical communication with the bladder. The arm is further provided with a lower elongate member having an upper connection point and a lower connection point. The upper connection point is pivotally connected to the second connection point of the upper elongate member. The lower connection point is attachable to the respective suction device.

It is contemplated that the axial displacement about the length of the upper elongate member between the first connection point and the second connection point defines a functional length of the upper elongate member as it relates to the functioning of the arm. Thus, the first connection point and the second connection point may be selectively disposed at various positions about the axial length of the upper elongate member to thereby alter the functional length of the upper elongate member as well as the functional length of the arm. Similarly, axial displacement along the axial length of the lower elongate member between the upper connection point and a lower connection point define a functional length of the lower elongate member. It is contemplated that the upper connection point and the lower connection point may be selectively disposed at various positions along the axial length of the lower elongate member to thereby alter the functional length of the lower elongate member as well as the functional length of the arm.

The upper connection point is pivotally connected to the second connection point of the upper elongate member. In addition, the first connection point of the upper elongate member is disposed in pivotal communication with the bladder. Further, the lower connection point of the lower elongate member is disposed in pivotal communication with the respective suction device.

Preferably, the variable direction adjustable arm further is provided with a shoulder locking device configured to substantially maintain the relative position of the upper elongate member to the bladder with respect to at least one pivot plane. Similarly, the arm may be provided with an elbow locking device configured to substantially maintain the relative position of the upper elongate member to the lower elongate member with respect to at least one pivot plane. A wrist locking device may also be provided which is configured to substantially maintain the relative position of the lower elongate member to the respective suction device.

In another embodiment of the present invention, the variable direction adjustable arm is provided with a curved elongate member. The curved elongate member is provided with a first end in pivotal communication with the bladder and a second end attachable to the respective suction device. The arm may be further provided with a ball joint disposed at the first end for pivotal communication with the bladder. Preferably the arm is provided with a locking device configured to substantially maintain the relative position of the curved elongate member to the bladder with respect to at least one pivot plane. The second end of the curved elongate member is preferably rigidly attached to the respective suction device.

In the preferred embodiment present invention, the pressure applicator is provided with a frame member with the bladder disposed beneath the frame member and the variable direction adjustable arm attached to the frame member. In addition a valve is provided which is in fluid communication with the bladder for injecting pressurized fluid into the bladder. The frame member may be provided with a first opening formed to receive the valve therethrough with the bladder disposed beneath the frame member. Furthermore, the valve is formed to controllably allow pressurized fluid to be injected into the bladder. The valve comprises a check valve for allowing pressurized fluid to enter the bladder while preventing the pressurized fluid to exit the bladder. In addition, there is provided a pressure relief valve which is in fluid communication with the bladder for controllably releasing pressurized fluid from the bladder. The frame member may be provided with a second opening formed to receive the relief valve therethrough.

In the preferred embodiment of the present invention, the pressure applicator device is provided with a frame member having a periphery. The bladder is disposed beneath and across the frame member. The bladder is sealably attached to the periphery of the frame member such that the bladder is inflatable when a pressurized fluid is injected between the bladder and the frame member. The bladder is preferably formed of a generally fluid tight material with respect to pressurized air. In addition, the bladder is formed of a heat conductive material, for transmitting heat to the repair patch from a heated fluid which is injected into the bladder. Additionally, the suction device may be provided with a suction cup and a vacuum port attachable to a vacuum source.

In another embodiment of the present invention, there is provided a pressure applicator device for applying pressure to a repair patch of an aircraft surface, the pressure applicator device comprising a suction member for providing suction attachment to the aircraft surface. The suction member is provided with a generally annular outer seal disposable around the repair patch. The suction member is further provided with a generally annular inner seal which is disposable radially interior to the outer seal and around the repair patch. The outer seal and the inner seal are configured to form a vacuum seal within the annular region therebetween. The pressure applicator device is further provided with a cover member. The cover member is disposable above and across the suction member. The cover member is sealably attached to the suction member and configured to form a pressure region interior to the suction member and the cover member, for applying pressure to the repair patch directly via an injected pressurized fluid. In addition, the pressure applicator device may be provided with an inflatable pressure bladder formed of a generally fluid tight elastic material. The bladder is disposed beneath the cover member and interior to the suction member and is configured for applying to the repair patch upon inflation of the bladder.

The present invention overcomes limitations associated with prior art pressure applicator devices. The limitations encountered with the vacuum bag method of applying pressure are mitigated in that the pressure applied to the repair patch is not limited by the vacuum bag seal achieved. In fact, the pressure applicator of the present invention is contemplated to be deployable on top of a vacuum bag arrangement for applying additional pressure beyond that applied by the vacuum bag. Furthermore, the present invention may be deployed in a variety of locations about the aircraft and therefore does not need to be significantly re-configured or altered for specific repairs. As such, the present invention mitigates the inefficiencies associated with repair specific tooling.

Advantageously, where the adhesive is a heat-curing adhesive, the pressure applicator of the present invention accommodates a heat source, such as a heating blanket, by simply being deployed on top of the blanket or other heat source.

Furthermore, where the repair surface is located at an area of the aircraft which is significantly contoured (such as the convex curvature at the leading edge of the aircraft wings and the concave curvature where the wings intersect the aircraft fuselage) the embodiments of the present invention provided with the variable direction adjustable arm are deployable at such contoured regions. The arm allows for the selective attachment of the accompanying suction device at a location on the aircraft surface where desired. Where the aircraft surface contains surface irregularities, which may tend to inhibit secure attachment of the suction device to such a surface, the arm further facilitates selective attachment of the suction device to avoid such irregularity containing surface regions.

In addition, the embodiment of the present invention which is provided with a suction member provided with generally annular outer and inner seals the suction device a significant attachment area is created to allow for secure attachment of the pressure applicator device. Further, this embodiment contemplates the application of direct pressure from an injected pressure source to the repair patch.

Accordingly, the present invention represents a significant advance in the art.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 1:
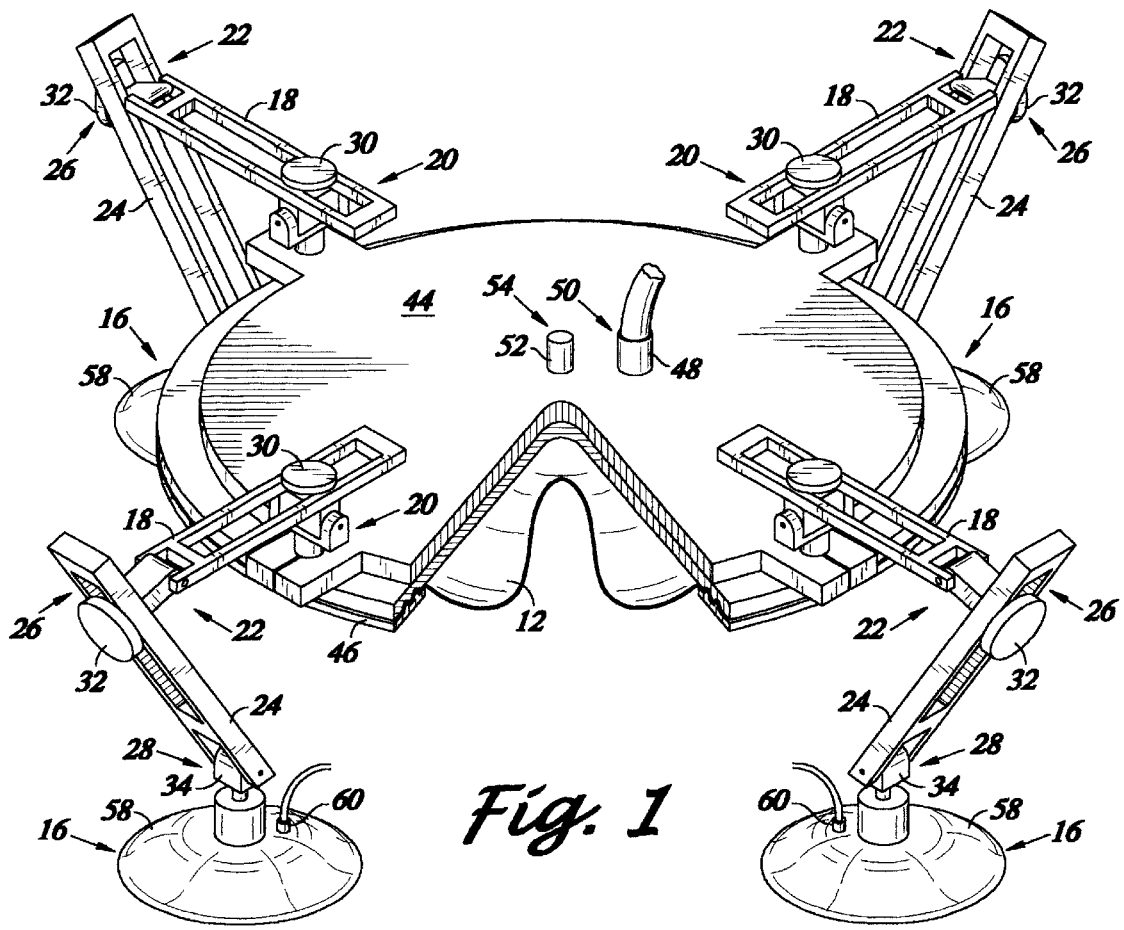
FIG. 1 is a perspective view of the present invention.
Figure 2:
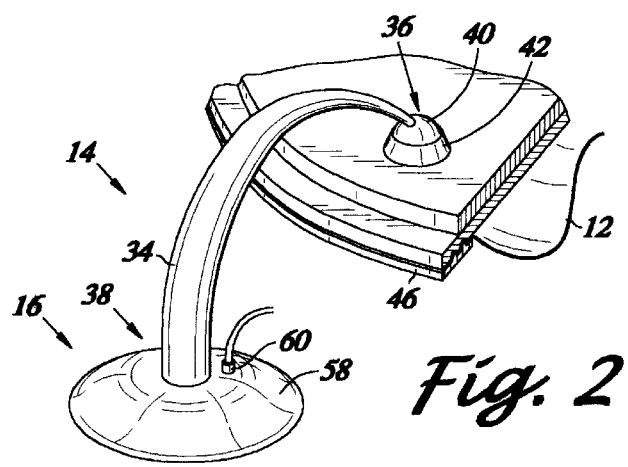
FIG. 2 is another embodiment of the variable direction adjustable arm provided in the present invention.
Figure 3:
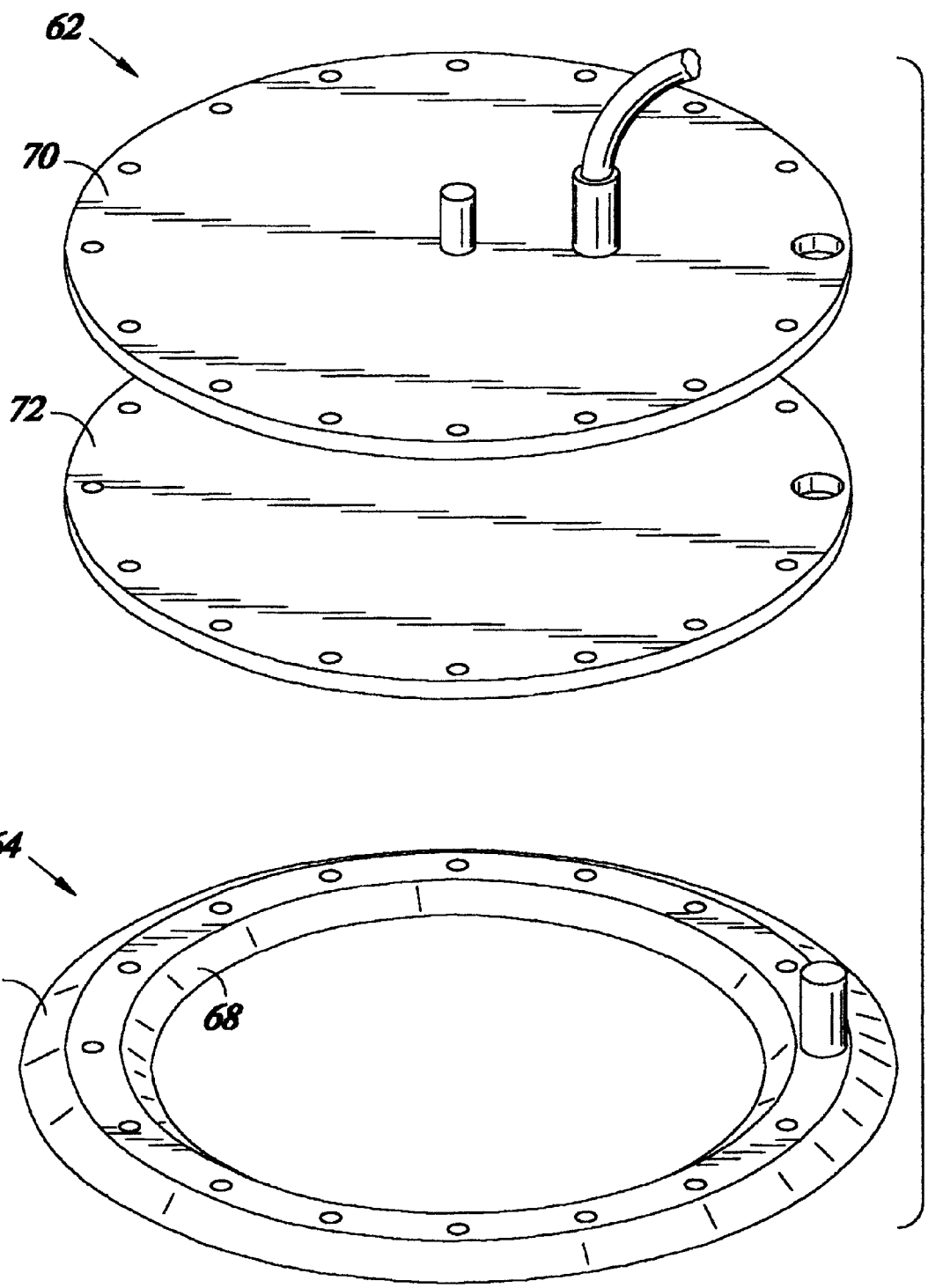
FIG. 3 is another embodiment of the present invention.

Referring now to the drawings wherein the showings are for purposes of illustrating a preferred embodiment of the present invention only, and not for purposes of limiting the same, FIGS. 1–3 illustrate a pressure applicator device which is constructed in accordance with the present invention. As will be described in more detail below, the pressure applicator device applies pressure to a repair patch for on-aircraft repairs.

Referring now to FIG. 1, in accordance with the present invention, a pressure applicator device 10 for applying pressure to a repair patch of a variable contoured aircraft surface, the pressure applicator device 10 is provided with an inflatable pressure bladder 12. The bladder is configured for applying pressure to a repair patch and is formed of a generally fluid tight elastic material. In this respect, fluid tight nature of the elastic material refers to liquids and gases, such as pressurized air. The pressure applicator device 10 is further provided with at least one variable direction adjustable arm 14. The arm 14 is disposed in mechanical communication with the bladder 12 for facilitating the application of pressure by the bladder 12 to the repair patch upon inflation of the bladder 12. The bladder 12 is provided with at least one suction device 16 for providing suction attachment to the aircraft surface. The bladder 12 is attachable to a respective one of the at least one variable direction adjustable arm 14. The arm 14 facilitates selective attachment of the respective suction device 16 to the variable contoured aircraft surface while maintaining the position of the bladder 12 with respect to the repair patch.

In the preferred embodiment of the present invention, the pressure applicator device 10 is provided with a frame member 44 having a periphery 56. The bladder 12 is disposed beneath and across the frame member 44. A retaining ring 46 is provided which is sized and configured to hold the bladder 12 between the retaining ring 46 and the frame member 44 for maintaining a fluidic seal. The bladder 12 is sealably attached to the periphery 56 of the frame member 44 such that the bladder 12 is inflatable when a pressurized fluid is injected between the bladder 12 and the frame member 44. The bladder 12 is preferably formed of a generally fluid tight material with respect to pressurized air. In addition, the bladder 12 is formed of a heat conductive material, for transmitting heat to the repair patch from a heated fluid which is injected into the bladder 12.

In addition, a valve 48 is provided which is in fluid communication with the bladder 12 for injecting pressurized fluid into the bladder 12. The frame member 44 may be provided with a first opening 50 formed to receive the valve 48 therethrough with the bladder 12 disposed beneath the frame member 44. Furthermore, the valve 48 is formed to controllably allow pressurized fluid to be injected into the bladder 12. The valve 48 comprises a check valve for allowing pressurized fluid to enter the bladder 12 while preventing the pressurized fluid to exit the bladder 12. In addition, there is provided a pressure relief valve 52 which is in fluid communication with the bladder 12 for controllably releasing pressurized fluid from the bladder 12. The frame member 44 may be provided with a second opening 54 formed to receive the relief valve 52 therethrough.

In one embodiment of the pressure applicator device 10 of the present invention, the variable direction adjustable arm 16 is provided with an upper elongate member 18. The upper elongate member 18 is provided with a first connection point 20 and second connection point 22. The first connection point 20 is disposed in mechanical communication with the bladder 12. The arm 14 is further provided with a lower elongate member 24 having an upper connection point 26 and a lower connection point 28. The upper connection point 26 is pivotally connected to the second connection point 22 of the upper elongate member 18. The lower connection point 28 is attachable to the respective suction device 16.

It is contemplated that the axial displacement about the length of the upper elongate member 18 between the first connection point 20 and the second connection point 22 defines a functional length of the upper elongate member 18 as it relates to the functioning of the arm 14. Thus, the first connection point 20 and the second connection point 22 may be selectively disposed at various positions about the axial length of the upper elongate member 18 to thereby alter the functional length of the upper elongate member 18 as well as the functional length of the arm 14. Similarly, axial displacement along the axial length of the lower elongate member 24 between the upper connection point 26 and a lower connection point 28 define a functional length of the lower elongate member 24. It is contemplated that the upper connection point 26 and the lower connection point 28 may be selectively disposed at various positions along the axial length of the lower elongate member 24 to thereby alter the functional length of the lower elongate member 24 as well as the functional length of the arm 14.

The upper connection point 26 is pivotally connected to the second connection point 22 of the upper elongate member 18. In addition, the first connection point 20 of the upper elongate member 18 is disposed in pivotal communication with the bladder 12. Further, the lower connection point 28 of the lower elongate member 24 is disposed in pivotal communication with the respective suction device 16.

Preferably, the variable direction adjustable arm 14 further is provided with a shoulder locking device 30 configured to substantially maintain the relative position of the upper elongate member 18 to the bladder 12 with respect to at least one pivot plane. Similarly, the arm 14 may be provided with an elbow locking device 32 configured to substantially maintain the relative position of the upper elongate member 18 to the lower elongate member 24 with respect to at least one pivot plane. A wrist locking device 32 may also be provided which is configured to substantially maintain the relative position of the lower elongate member 24 to the respective suction device 16.

Referring now to FIG. 2, in another embodiment of the present invention, the variable direction adjustable arm 14 is provided with a curved elongate member 34. The curved elongate member 34 is provided with a first end 36 in pivotal communication with the bladder 12 and a second end 38 attachable to the respective suction device 16. The arm 14 may be further provided with a ball joint 40 disposed at the first end 36 for pivotal communication with the bladder 12. Preferably the arm 14 is provided with a locking device 42 configured to substantially maintain the relative position of the curved elongate member 34 to the bladder 12 with respect to at least one pivot plane. The second end 38 of the curved elongate member 34 is preferably rigidly attached to the respective suction device 16.

In either of the above described embodiments of the present invention, suction device 16 may be provided with a suction cup 58 and a vacuum port 60 attachable to a vacuum source.

It is contemplated that the aircraft surface at the repair patch may be oriented significantly different from those surfaces immediately adjacent to the repair patch. For example, the convex curvature at the leading edge of the aircraft wings and the concave curvature where the wings intersect the aircraft fuselage present potential repair areas where the aircraft surface at the repair patch is significantly different from adjacent surface areas. The variable direction adjustable arm 14 facilities the deployment of the pressure applicator device 10 of the present invention at such contoured aircraft surfaces. The arm 14 allows for the selective attachment of the accompanying suction device 16 at a location on the aircraft surface where desired because of its variable direction and adjustable nature. Furthermore, where the aircraft surface contains surface irregularities, which may tend to inhibit secure attachment of the suction device 16 to such a surface, the variable direction adjustable arm further facilitates selective attachment of the suction device 16 to avoid such irregularity containing surface regions.

Referring now to FIG. 3, in another embodiment of the present invention, there is provided a pressure applicator device 62 for applying pressure to a repair patch of an aircraft surface, the pressure applicator device 62 comprising a suction member 64 for providing suction attachment to the aircraft surface. The suction member 64 is provided with a generally annular outer seal 66 disposable around the repair patch. The suction member 64 is further provided with a generally annular inner seal 68 which is disposable radially interior to the outer seal 66 and around the repair patch. Thus, the outer seal 66 and the inner seal 68 are formed to define an annular region therebetween and cooperatively form a vacuum seal there at. The pressure applicator device 62 is provided with a cover member 70. The cover member 70 is disposable above and across the suction member 64. The cover member 70 is sealably attached to the suction member 64 and configured to form a pressure region interior to the suction member 64 and the cover member 70, for applying pressure to the repair patch directly via an injected pressurized fluid. The pressure applicator device 62 is preferably provided with an inflatable pressure bladder 72 formed of a generally fluid tight elastic material. The bladder 72 is disposed beneath the cover member 70 and radially interior to the suction member 64 and is configured for applying to the repair patch upon inflation of the bladder 72.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A pressure applicator device for applying pressure to a repair patch of a variable contoured aircraft surface, the pressure applicator device comprising:

an inflatable pressure bladder, configured for applying pressure to the repair patch and formed of a generally fluid tight elastic material;

at least one variable direction adjustable arm, in mechanical communication with the bladder, for facilitating the application of pressure by the bladder to the repair patch upon inflation of the bladder, the adjustable arm having upper and lower elongate members, the upper elongate member having first and second connection points, the first connection point being in mechanical communication with the bladder, the lower elongate member having upper and lower connection points, the upper connection point being pivotally connected to the second connection point of the upper elongate member;

at least one suction device for providing suction attachment to the aircraft surface, attachable to the lower connection point of a respective one of the at least one variable direction adjustable arm; and wherein the variable direction adjustable arm facilitates selective attachment of the respective suction device to the variable contoured aircraft surface while maintaining the position of the bladder with respect to the repair patch.

2. The pressure applicator device of claim 1 wherein the first connection point of the upper elongate member is in pivotal communication with the bladder.

3. The pressure applicator device of claim 1 wherein the lower connection point of the lower elongate member is in pivotal communication with the respective suction device.

4. The pressure applicator device of claim 1 wherein the variable direction adjustable arm further comprises a shoulder locking device configured to substantially maintain the relative position of the upper elongate member to the bladder with respect to at least one pivot plane.

5. The pressure applicator device of claim 1 wherein the variable direction adjustable arm further comprises an elbow locking device configured to substantially maintain the relative position of the upper elongate member to the lower elongate member with respect to at least one pivot plane.

6. The pressure applicator device of claim 1 wherein the variable direction adjustable arm further comprises a wrist locking device configured to substantially maintain the relative position of the lower elongate member to the respective suction device with respect to at least one pivot plane.

7. The pressure applicator device of claim 1 wherein the bladder comprises a heat conductive material, for transmitting heat to the repair patch from a heated fluid which is injected into the bladder.

8. The pressure applicator device of claim 1 wherein the suction device comprises a suction cup and a vacuum port attachable to a vacuum source.

9. A pressure applicator device for applying pressure to a repair patch of a variable contoured aircraft surface, the pressure applicator device comprising:

an inflatable pressure bladder, configured for applying pressure to the repair patch and formed of a generally fluid tight elastic material;

at least one variable direction adjustable arm for facilitating the application of pressure by the bladder to the repair patch upon inflation of the bladder, the arm comprising:

an upper elongate member having a first end and a second end, the first end in mechanical communication with the bladder; and a lower elongate member having an upper end and a lower end, the upper end pivotally connected to the second end of the upper elongate member;

at least one suction device for providing suction attachment to the aircraft surface, attachable to the lower end of a respective one of the at least one, variable direction adjustable arm; and wherein the variable direction adjustable arm facilitates selective attachment of the respective suction device to the variable contoured aircraft surface while maintaining the position of the bladder with respect to the repair patch.

10. The pressure applicator device of claim 9 wherein the variable direction adjustable arm comprises a curved elongate member having a first end in pivotal communication with the bladder and a second end attachable to the respective suction device.

11. The pressure applicator device of claim 10 wherein the variable direction adjustable arm further comprises a ball joint disposed at the first end for pivotal communication with the bladder.

12. The pressure applicator device of claim 10 wherein the variable direction adjustable arm further comprises a locking device configured to substantially maintain the relative position of the curved elongate member to the bladder with respect to at least one pivot plane.

13. The pressure applicator device of claim 10 wherein the second end of the curved elongate member is rigidly attached to the respective suction device.

14. A pressure applicator device for applying pressure to a repair patch of a variable contoured aircraft surface, the pressure applicator device comprising:

an inflatable pressure bladder, configured for applying pressure to the repair patch and formed of a generally fluid tight elastic material;

at least one variable direction adjustable arm comprising a curved elongate member having a first end in pivotal communication with the bladder and a second end, for facilitating the application of pressure by the bladder to the repair patch upon inflation of the bladder;

at least one suction device for providing suction attachment to the aircraft surface, attachable to the second end of a respective one of the at least one variable direction adjustable arm; and wherein the variable direction adjustable arm facilitates selective attachment of the respective suction device to the variable contoured aircraft surface while maintaining the position of the bladder with respect to the repair patch.

15. The pressure applicator device of claim 14 further comprises a frame member, the bladder disposed beneath the frame member and the variable direction adjustable arm attached to the frame member.

16. The pressure applicator device of claim 14 further comprises a valve in fluid communication with the bladder for injecting pressurized fluid into the bladder.

17. The pressure applicator device of claim 16 further comprises a frame member having a first opening formed to receive the valve therethrough, the bladder disposed beneath the frame member.

18. The pressure applicator device of claim 16 wherein the valve is formed to controllably allow pressurized fluid to be injected into the bladder.

19. The pressure applicator device of claim 16 wherein the valve comprises a check valve for allowing pressurized fluid to enter the bladder while preventing the pressurized fluid to exit the bladder.

20. The pressure applicator device of claim 14 further comprises a pressure relief valve in fluid communication with the bladder for controllably releasing pressurized fluid from the bladder.

21. The pressure applicator device of claim 20 further comprises a frame member having a second opening formed to receive the relief valve therethrough, the bladder disposed beneath the frame member.

22. The pressure applicator device of claim 14 further comprises a frame member having a periphery, the bladder disposed beneath and across the frame member, the bladder sealably attached to the periphery of the frame member such that the bladder is inflatable when a pressurized fluid is injected between the bladder and the frame member.

23. The pressure applicator device of claim 14 wherein the bladder comprises a generally fluid tight material with respect to pressurized air.

* * * * *